United States Patent
Sung

(10) Patent No.: US 8,346,493 B2
(45) Date of Patent: Jan. 1, 2013

(54) METHOD FOR DEPLOYING CLIMATE SENSOR IN INDOOR SPACE AND STORAGE MEDIUM FOR STORING THEREOF

(75) Inventor: Jing-Tian Sung, Taichung (TW)

(73) Assignee: Institute for Information Industry, Taipei (TW)

( * ) Notice: Subject to any disclaimer, the term of this patent is extended or adjusted under 35 U.S.C. 154(b) by 490 days.

(21) Appl. No.: 12/635,250

(22) Filed: Dec. 10, 2009

(65) Prior Publication Data

US 2011/0125426 A1     May 26, 2011

(30) Foreign Application Priority Data

Nov. 25, 2009  (TW) ................................ 98140171 A

(51) Int. Cl.
*G01F 17/00*  (2006.01)
(52) U.S. Cl. ........................................................... 702/50
(58) Field of Classification Search ................ 702/50; 700/300; 438/7; 236/1 C
See application file for complete search history.

(56) References Cited

U.S. PATENT DOCUMENTS

| | | | | |
|---|---|---|---|---|
| 5,286,109 A | * | 2/1994 | Hanscombe et al. | 374/119 |
| 5,635,409 A | * | 6/1997 | Moslehi | 438/7 |
| 7,825,369 B2 | * | 11/2010 | Hane | 250/237 G |
| 2005/0051637 A1 | * | 3/2005 | Hansen | 236/1 C |
| 2010/0076726 A1 | * | 3/2010 | Resende et al. | 702/181 |
| 2010/0286843 A1 | * | 11/2010 | Lyon | 700/300 |

FOREIGN PATENT DOCUMENTS

JP     2006046848 A  *  2/2006

* cited by examiner

*Primary Examiner* — Jonathan C Teixeira Moffat
*Assistant Examiner* — Xiuquin Sun
(74) *Attorney, Agent, or Firm* — McClure, Qualey & Rodack, LLP

(57) ABSTRACT

A method for deploying at least one climate sensor in an indoor space includes: several candidate deploy points in the indoor space are obtained. Climate properties at the candidate deploy points are obtained. Deploy-point-number limit is obtained. Available deploy point sets, which conform to the deploy-point-number limit, are generated according to the candidate deploy points. Climate-property differences of the available deploy point sets are calculated according to the climate properties at the candidate deploy points. The climate-property differences of the available deploy point sets are differences between the climate properties at the available deploy point sets and those at the candidate deploy points. A target deploy point set, climate-property difference of which is the least among those of the available deploy point sets, is selected from the available deploy point sets. At least one first climate sensor is deployed at the target deploy point of the target deploy point set.

16 Claims, 2 Drawing Sheets

METHOD FOR DEPLOYING CLIMATE SENSOR IN INDOOR SPACE AND STORAGE MEDIUM FOR STORING THEREOF

RELATED APPLICATIONS

This application claims priority to Taiwan Application Serial Number 98140171, filed Nov. 25, 2009, which is herein incorporated by reference.

BACKGROUND

1. Technical Field

The present invention relates to a method for deploying sensors and a storage medium for storing thereof. More particularly, the present invention relates to a method for deploying at least one climate sensor in an indoor space and a storage medium for storing thereof.

2. Description of Related Art

As building techniques improve, buildings are often built with large indoor spaces. To make people feel comfortable staying in buildings with large indoor spaces, many machines, such as central air conditioning or lamps, maintain a comfortable man-made climate indoors.

Since operational status of central air conditioning is controlled according to indoor temperature, many temperature sensors are deployed in buildings with large indoor spaces for measuring indoor temperature. Therefore, in prior art, temperature sensors are evenly deployed in buildings with large spaces.

However the temperature inside buildings with large indoor spaces is not distributed evenly. In other words, temperature measured at a sensor deploy point may be much different from real temperature near the sensor deploy point. Therefore, the adjustments to the temperature often makes people inside buildings with large spaces uncomfortable and more power is consumed by the central air conditioning since the central air conditioning is controlled according to temperature measured by evenly deployed temperature sensors.

SUMMARY

According to one embodiment of this invention, a method for deploying at least one climate sensor in an indoor space is provided. The method for deploying at least one climate sensor in an indoor space includes the following steps: several candidate deploy points in an indoor space are obtained. Climate properties at the candidate deploy points are obtained. Deploy-point-number limit is obtained. Available deploy point sets, which conform to the deploy-point-number limit, are generated according to the candidate deploy points. Climate-property differences of the available deploy point sets are calculated according to the climate properties at the candidate deploy points. Wherein, the climate-property differences of the available deploy point sets are differences between the climate properties at the available deploy point sets and those at the candidate deploy points. A target deploy point set, climate-property difference of which is the least among those of the available deploy point sets, is selected from the available deploy point sets. Wherein, the target deploy point set includes at least one target deploy point. At least one first climate sensor is deployed at the target deploy point.

According to another embodiment of this invention, a storage medium to store several instructions to execute a method for deploying at least one climate sensor in an indoor space is provided. The method for deploying at least one climate sensor in an indoor space includes the following steps: several candidate deploy points in an indoor space are obtained. Climate properties at the candidate deploy points are obtained. Deploy-point-number limit is obtained. Available deploy point sets, which conform to the deploy-point-number limit, are generated according to the candidate deploy points. Climate-property differences of the available deploy point sets are calculated according to the climate properties at the candidate deploy points. Wherein, the climate-property differences of the available deploy point sets are differences between the climate properties at the available deploy point sets and those at the candidate deploy points. A target deploy point set, climate-property difference of which is the least among those of the available deploy point sets, is selected from the available deploy point sets. Wherein, the target deploy point set includes at least one target deploy point. At least one first climate sensor is deployed at the target deploy point.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
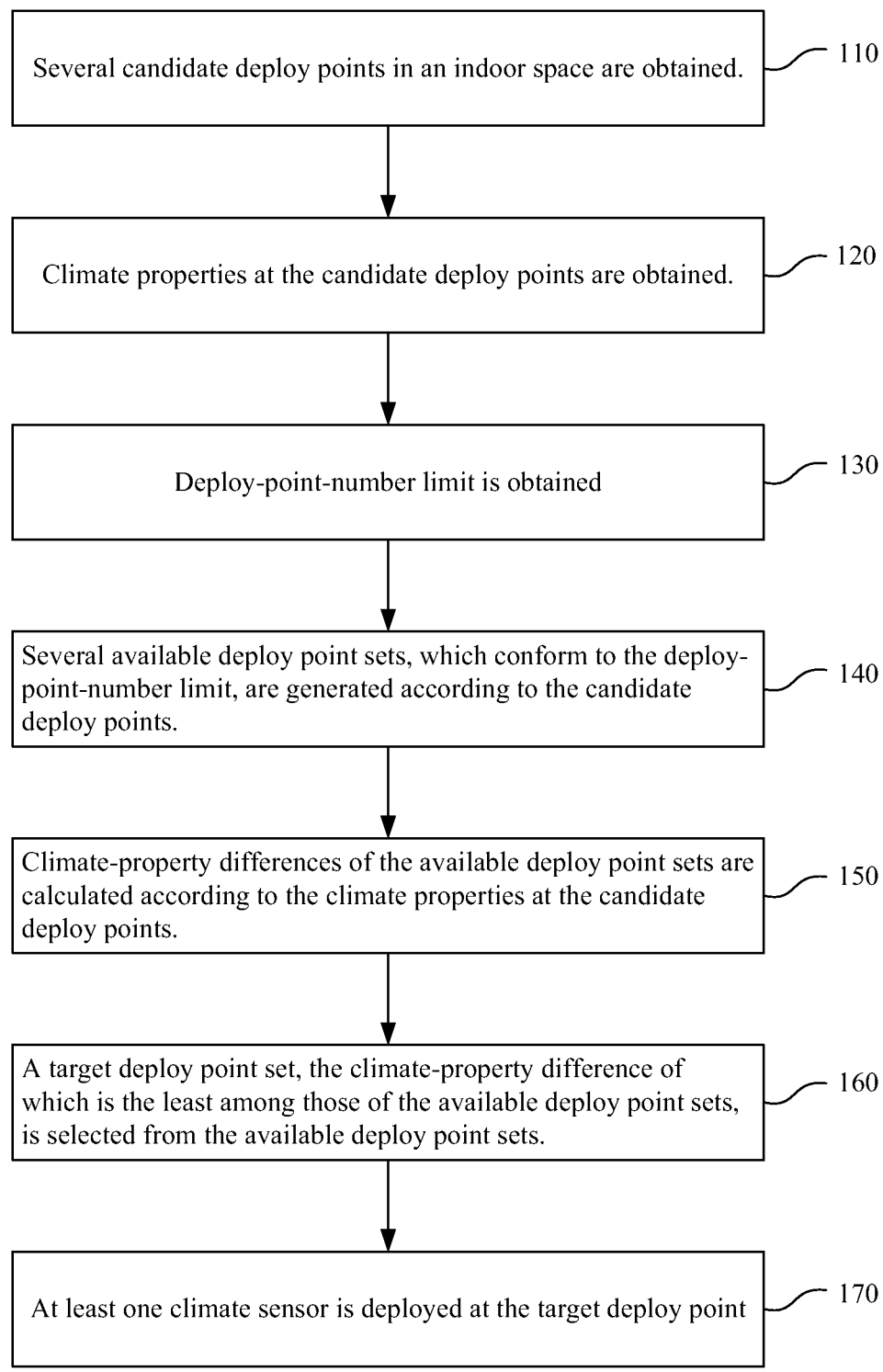
FIG. 1 is a flow diagram of a method for deploying at least one climate sensor in an indoor space according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Figure 2:
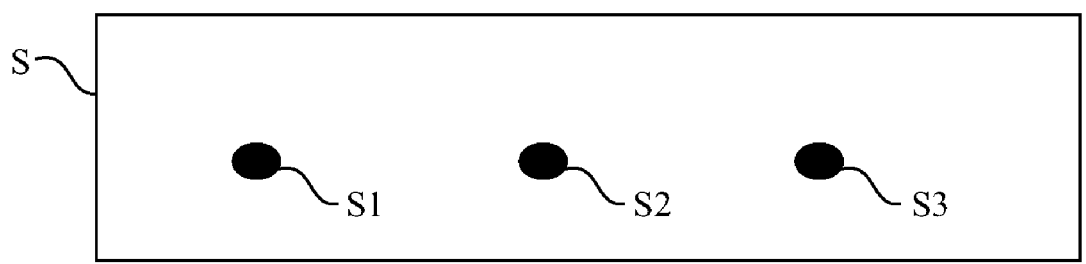
FIG. 2 is an embodiment of an indoor space.

FIG. 1 is a flow diagram of a method for deploying at least one climate sensor in an indoor space according to one embodiment of this invention. FIG. 2 is an embodiment of an indoor space. In the method for deploying at least one climate sensor in an indoor space, at least one candidate deploy point, the climate property of which differs the least from the other candidate deploy points, is selected. Then, at least one climate sensor is deployed at the selected candidate deploy point. The climate sensor may be a temperature sensor, a humidity sensor, a light sensor or other types of climate sensors. The method for deploying at least one climate sensor in an indoor space may take the form of a computer program product stored on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives.

Referring to FIG. 1 and FIG. 2, the method for deploying at least one climate sensor in an indoor space 100 includes the following steps:

In step 110, several candidate deploy points S1, S2 and S3 in an indoor space S are obtained. In other embodiments, candidate deploy points may be set at different locations of different indoor spaces. In addition, the number of candidate deploy points may differ in other embodiments.

In step 120, climate properties at the candidate deploy points S1, S2 and S3 are obtained. Wherein, the climate properties at the candidate points S1, S2 and S3 may be temperature, humidity, illumination or other climate related properties at the candidate points S1, S2 and S3.

Wherein, the climate properties at the candidate deploy points S1, S2 and S3 may be obtained (step 120) by obtaining blueprint of the indoor space S and calculating the climate properties at the candidate deploy points S1, S2 and S3 according to the blueprint of the indoor space S. For example, if temperature or humidity at the candidate points S1, S2 and S3 is the climate properties at the candidate deploy points S1, S2 and S3 to be calculated, heat transfer analysis can be utilized to calculate the temperature or humidity at the candidate deploy points S1, S2 and S3 according to the blueprint of the indoor space S. In addition, climate sensors can be pre-deployed at the candidate deploy points S1, S2 and S3 to measure the climate properties at the candidate deploy points S1, S2 and S3 for step 120.

In step 130, deploy-point-number limit is obtained. Wherein, the deploy-point-number limit may be upper bound to deploy point number, range limit for deploy point number or other limit for deploy point number.

In step 140, several available deploy point sets, which conform to the deploy-point-number limit, are generated according to the candidate deploy points S1, S2 and S3. For example, when the deploy-point-number limit is "one point at most", the available deploy point sets generated in step 140 are {S1}, {S2} and {S3}. In other embodiments, the available deploy point sets generated may differ as candidate deploy points or deploy-point-number limits differ.

In step 150, climate-property differences of the available deploy point sets {S1}, {S2} and {S3} are calculated according to the climate properties at the candidate deploy points S1, S2 and S3. Wherein, average differences between the climate properties at the available deploy point sets {S1}, {S2} and {S3} and those at the candidate deploy points S1, S2 and S3 may be utilized as the climate-property differences of the available deploy point sets {S1}, {S2} and {S3}. For example, the climate-property differences of the available deploy point sets {S1} may be average differences between the climate properties at the deploy point S1 of the available deploy point sets {S1} and those at the candidate deploy points S1, S2 and S3. In other embodiments, climate-property differences of the available deploy point sets {S1}, {S2} and {S3} may be calculated utilizing root mean square (RMS), sum of difference or other statistical methods.

Since environmental conditions (such as season, time or operating status of air conditioners in the indoor space S) may affect climate property in the indoor space S, the environmental status may be taken into consideration in the method for deploying at least one climate sensor in an indoor space 100. Therefore, environmental conditions may be recorded when the climate properties at the candidate deploy points S1, S2 and S3 are obtained (step 120). The recorded environmental conditions may include season, time, operating status of air conditioners in the indoor space S, or any other environmental condition, which may affect the climate property in the indoor space S. Then, differences between the climate properties at the available deploy point sets {S1}, {S2} and {S3} and those at the candidate deploy points S1, S2 and S3 in the same environmental conditions are calculated and assigned as the climate-property differences of the available deploy point sets {S1}, {S2} and {S3}.

In step 160, a target deploy point set, the climate—property difference of which is the least among those of the available deploy point sets {S1}, {S2} and {S3}, is selected from the available deploy point sets {S1}, {S2} and {S3}. Wherein, the target deploy point set includes at least one target deploy point. For example, if climate-property difference of {S1} is the least among those of the available deploy point sets {S1}, {S2} and {S3}, {S1} is selected as the target deploy point set and S1 is taken as the target deploy point.

In step 170, at least one climate sensor is deployed at the target deploy point S1. Then, the climate property at the target deploy point S1 can be measured by the climate sensor deployed at the target deploy point S1. Since climate property at the target deploy point S1 differs least from those at the other candidate deploy points S2 and S3, the climate property measured at the target deploy point S1 can be taken as the climate property of the indoor space S. In addition, since climate property at the candidate deploy points S1, S2 and S3 of the indoor space S may be related to that at the target deploy point S1, climate distribution in the indoor space S can be calculated according to the measured climate property at the target deploy point S1. Thus, climate, such as temperature, humidity, light or other kinds of climate, in the indoor space S can be controlled according to the climate distribution in the indoor space S utilizing machines like central air conditioning or lamps.

Above all, climate property measured by the climate sensors, which is deployed at the at least one deploy point generated by one embodiment of this invention, differs least from other points in the indoor space. If temperature sensors are deployed in the indoor space utilizing one embodiment of this invention, temperature measured by the temperature sensors thereof differs least from temperature at other points of the indoor space thereof, people in the indoor space may feel comfortable if the central air conditioning operates according to which. In addition, power consumption of the central air conditioning may be reduced since the central air conditioning may operate in a suitable status according to the measured temperature thereof. Besides, reducing the deploy-point-number limit can make number of the deployed climate sensors reduced, which can decrease cost for deploying the climate sensors.

Although the present invention has been described in considerable detail with reference to certain embodiments thereof, other embodiments are possible. Therefore, their spirit and scope of the appended claims should not be limited to the description of the embodiments container herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for deploying at least one climate sensor in an indoor space executed by a computer, comprising:
   obtaining by the computer a plurality of candidate deploy points in the indoor space;
   obtaining by the computer climate properties at the candidate deploy points;
   obtaining by the computer deploy-point-number limit;

generating by the computer a plurality of available deploy point sets, which conform to the deploy-point-number limit, according to the candidate deploy points, wherein each of the available deploy point sets is formed by at least one of the candidate deploy points, the number of which conforms to the deploy-point-number limit;

calculating by the computer climate-property differences of the available deploy point sets according to the climate properties at the candidate deploy points, wherein the climate-property differences of the available deploy point sets are differences between the climate properties at the available deploy point sets and those at the candidate deploy points;

selecting by the computer a target deploy point set, the climate-property difference of which is the least among those of the available deploy point sets, from the available deploy point sets, wherein the target deploy point set comprises at least one target deploy point;

deploying by the computer at least one first climate sensor at the target deploy point;

measuring by the computer climate property at the target deploy point utilizing the first climate sensor deployed at the target deploy point;

calculating by the computer climate distribution in the indoor space according to the measured climate property at the target deploy point; and controlling by the computer climate in the indoor space utilizing a central air conditioning device or a plurality of lamps according to the climate distribution.

2. The method for deploying at least one climate sensor in an indoor space executed by a computer of claim 1, further comprising:

recording environmental conditions when the climate properties at the candidate deploy points are obtained.

3. The method for deploying at least one climate sensor in an indoor space executed by a computer of claim 2, wherein the step of calculating the climate-property differences of the available deploy point sets according to the climate properties at the candidate deploy points comprises:

calculating and assigning differences between the climate properties at the available deploy point sets and those at the candidate deploy points in the same environmental conditions as the climate-property differences of the available deploy point sets.

4. The method for deploying at least one climate sensor in an indoor space executed by a computer of claim 2, wherein the recorded environmental conditions include season, time or operating status of air conditioners in the indoor space when the climate properties at the candidate deploy points are obtained.

5. The method for deploying at least one climate sensor in an indoor space executed by a computer of claim 1, wherein the step of obtaining the climate properties at the candidate deploy points comprises:

obtaining a blueprint of the indoor space; and calculating the climate properties at the candidate deploy points according to the blueprint of the indoor space.

6. The method for deploying at least one climate sensor in an indoor space executed by a computer of claim 5, wherein the climate properties at the candidate deploy points includes temperature or humidity at the candidate points, and the step of calculating the climate properties at the candidate deploy points according to the blueprint of the indoor space is accomplished utilizing heat transfer analysis.

7. The method for deploying at least one climate sensor in an indoor space executed by a computer of claim 1, wherein the step of obtaining the climate properties at the candidate deploy points comprises:

deploying a plurality of second climate sensors at the candidate deploy points; and measuring the climate properties at the candidate deploy points utilizing the second climate sensors.

8. The method for deploying at least one climate sensor in an indoor space executed by a computer of claim 1, wherein the first climate sensors are temperature sensors, humidity sensors or light sensors.

9. A non-transitory storage medium to store a plurality of instructions to execute a method for deploying at least one climate sensor in an indoor space executed by a computer, wherein the method for deploying at least one climate sensor in an indoor space comprises:

obtaining a plurality of candidate deploy points in an indoor space;

obtaining climate properties at the candidate deploy points;

obtaining deploy-point-number limit;

generating a plurality of available deploy point sets, which conform to the deploy-point-number limit, according to the candidate deploy points, wherein each of the available deploy point sets is formed by at least one of the candidate deploy points, the number of which conforms to the deploy-point-number limit;

calculating climate-property differences of the available deploy point sets according to the climate properties at the candidate deploy points, wherein the climate-property differences of the available deploy point sets are differences between the climate properties at the available deploy point sets and those at the candidate deploy points;

selecting a target deploy point set, the climate-property difference of which is the least among those of the available deploy point sets, from the available deploy point sets, wherein the target deploy point set comprises at least one target deploy point; deploying at least one first climate sensor at the target deploy point;

measuring climate property at the target deploy point utilizing the first climate sensor deployed at the target deploy point;

calculating climate distribution in the indoor space according to the measured climate property at the target deploy point; and controlling climate in the indoor space utilizing a central air conditioning device or a plurality of lamps according to the climate distribution.

10. The non-transitory storage medium to store a plurality of instructions to execute a method for deploying at least one climate sensor in an indoor space executed by a computer of claim 9, wherein the method for deploying at least one climate sensor in an indoor space executed by a computer further comprises:

recording environmental conditions when the climate properties at the candidate deploy points are obtained.

11. The non-transitory storage medium to store a plurality of instructions to execute a method for deploying at least one climate sensor in an indoor space executed by a computer of claim 10, wherein the step of calculating the climate-property differences of the available deploy point sets according to the climate properties at the candidate deploy points comprises:

calculating and assigning differences between the climate properties at the available deploy point sets and those at the candidate deploy points in the same environmental conditions as the climate-property differences of the available deploy point sets.

12. The non-transitory storage medium to store a plurality of instructions to execute a method for deploying at least one climate sensor in an indoor space executed by a computer of claim 10, wherein the recorded environmental conditions include season, time or operating status of air conditioners in the indoor space when the climate properties at the candidate deploy points are obtained.

13. The non-transitory storage medium to store a plurality of instructions to execute a method for deploying at least one climate sensor in an indoor space executed by a computer of claim 9, wherein the step of obtaining the climate properties at the candidate deploy points comprises:
   obtaining a blueprint of the indoor space; and
   calculating the climate properties at the candidate deploy points according to the blueprint of the indoor space.

14. The non-transitory storage medium to store a plurality of instructions to execute a method for deploying at least one climate sensor in an indoor space executed by a computer of claim 13, wherein the climate properties at the candidate deploy points includes temperature or humidity at the candidate points, and the step of calculating the climate properties at the candidate deploy points according to the blueprint of the indoor space is accomplished utilizing heat transfer analysis.

15. The non-transitory storage medium to store a plurality of instructions to execute a method for deploying at least one climate sensor in an indoor space executed by a computer of claim 9, wherein the step of obtaining the climate properties at the candidate deploy points comprises:
   deploying a plurality of second climate sensors at the candidate deploy points; and
   measuring the climate properties at the candidate deploy points utilizing the second climate sensors.

16. The non-transitory storage medium to store a plurality of instructions to execute a method for deploying at least one climate sensor in an indoor space executed by a computer of claim 9, wherein the first climate sensors are temperature sensors, humidity sensors or light sensors.

* * * * *